US010681435B2

(12) United States Patent
Rafique et al.

(10) Patent No.: US 10,681,435 B2
(45) Date of Patent: Jun. 9, 2020

(54) METHOD AND APPARATUS FOR OPTIMIZING DYNAMICALLY THE OPERATION OF AN OPTICAL NETWORK

(71) Applicant: ADVA Optical Networking SE, Meiningen OT Dreissigacker (DE)

(72) Inventors: Danish Rafique, Germering (DE); Thomas Szyrkowiec, Germering (DE); Joerg-Peter Elbers, Meiningen (DE)

(73) Assignee: ADVA OPTICAL NETWORKING SE, Meiningen OT Dreissigacker (DE)

( * ) Notice: Subject to any disclaimer, the term of this patent is extended or adjusted under 35 U.S.C. 154(b) by 0 days.

(21) Appl. No.: 16/278,607

(22) Filed: Feb. 18, 2019

(65) Prior Publication Data
US 2019/0261071 A1    Aug. 22, 2019

(30) Foreign Application Priority Data

Feb. 21, 2018   (EP) .................................... 18157843

(51) Int. Cl.
*H04J 14/02*     (2006.01)
*H04Q 11/00*    (2006.01)
*G06N 3/04*      (2006.01)
*G06N 3/08*      (2006.01)
(Continued)

(52) U.S. Cl.
CPC .......... *H04Q 11/0062* (2013.01); *G06N 3/04* (2013.01); *G06N 3/08* (2013.01); *H04B 10/07* (2013.01); *H04B 10/0793* (2013.01); *H04Q 2011/0079* (2013.01); *H04Q 2011/0084* (2013.01); *H04Q 2011/0086* (2013.01); *H04Q 2011/0088* (2013.01)

(58) Field of Classification Search
CPC .................................................. H04J 14/0227
See application file for complete search history.

(56) References Cited

U.S. PATENT DOCUMENTS 6,275,990 B1    8/2001    Dapper et al.
8,009,985 B1    8/2011    Roberts et al.
8,995,249 B1    3/2015    Roy et al.
(Continued)

FOREIGN PATENT DOCUMENTS

| EP | 2 375 637 A1 | 10/2011 |
| WO | WO 2013/005414 A1 | 1/2013 |
| WO | WO 2016/082859 A1 | 6/2016 |

OTHER PUBLICATIONS

English machine translation of WO 2013/005414 A1, 2013.*
(Continued)

*Primary Examiner* — Shi K Li
(74) *Attorney, Agent, or Firm* — Jenkins, Wilson, Taylor & Hunt, P.A.

(57) ABSTRACT

An apparatus and method for optimizing dynamically the performance of an optical network, said apparatus comprising at least one learning engine adapted to update a learning model in response to network metrics of said optical network collected during operation of said optical network, wherein the updated learning model is used to generate channel rank information for network channels; and a recommendation engine adapted to change a network channel throughput, a signal path and/or a spectral location of at least one network channel based on the channel rank information generated by the learning model of said learning engine.

20 Claims, 16 Drawing Sheets

(51) Int. Cl.
   *H04B 10/07*     (2013.01)
   *H04B 10/079*    (2013.01)

(56) References Cited

U.S. PATENT DOCUMENTS

| | | |
|---|---|---|
| 9,258,190 B2 | 2/2016 | Swinkels et al. |
| 2008/0250265 A1 | 10/2008 | Chang et al. |
| 2011/0142446 A1 | 6/2011 | Lyubomirsky |
| 2013/0045006 A1 | 2/2013 | Dahan et al. |
| 2014/0056220 A1 | 2/2014 | Poitau et al. |
| 2014/0341595 A1* | 11/2014 | Harley ............... H04B 10/616 398/208 |
| 2015/0317197 A1* | 11/2015 | Blair .................. G06N 7/005 714/47.3 |
| 2015/0333824 A1* | 11/2015 | Swinkels ........... H04J 14/0227 398/25 |
| 2017/0366398 A1* | 12/2017 | Mizrachi ............ H04L 41/0813 |
| 2019/0068482 A1 | 2/2019 | Rafique et al. |

OTHER PUBLICATIONS

Communication of the Extended European Search Report for European Patent Application Serial No. 17187977.8 (Feb. 9, 2018).

Extended European Search Report for European Patent Application Serial No. 18157843.6 (Aug. 1, 2018).

Non-Final Office Action for U.S. Appl. No. 16/112,295 (dated Sep. 12, 2019).

Siracusa et al., "Proactive Restoration of Slow-Failures in Optical Networks," ICTON 2014, pp. 1-4 (2014).

Goncalves et al., "Applying Artificial Neural Networks for Fault Prediction in Optical Network Links," Telecommunications and Networking—ICT 2004, pp. 654-659 (2004).

Notice of Allowance and Fee(s) Due for U.S. Appl. No. 16/112,295 (dated Jan. 17, 2020).

\* cited by examiner

| | | | | |
|---|---|---|---|---|
| Configuration | Spectral Efficiency | Amplifier Type | Fiber Type | Acc. Dispersion | Grid |
| Operational | Power Supply Level | Shelf Temperature | Operating LASER Temperature | Humidity | - |
| Device | Laser Wavelength | Amplifier Noise Figure | Fiber Loss | ROADM drift | Driver V |
| System | BER | OSNR | Q-factor | Nonlinear noise | TX/RX Power |

Fig 16

METHOD AND APPARATUS FOR OPTIMIZING DYNAMICALLY THE OPERATION OF AN OPTICAL NETWORK

PRIORITY CLAIM

This application claims the benefit of European Patent Application No. 18157843.6, filed Feb. 21, 2018, the disclosure of which is incorporated herein by reference in its entirety.

TECHNICAL FIELD

The invention relates to a method and apparatus for optimizing dynamically the operation of an optical network providing a learning based recommendation system for dynamic optical network operation.

BACKGROUND

An optical network can comprise a plurality of components and network nodes connected to each other via optical fiber spans. Conventional optical networks are operated based on passive and pre-calculated network rules. These network rules typically represent pessimistic network design, and require exhaustive system verification effort. Thus, conventional approaches do not scale well with the increasing network complexity and provide a sub-optimal operation of the optical network.

Conventional optical transport networks typically employ capacity provisioning and allocations and can use pre-calculated performance tables and hard-coded engineering rules relating to the network, i.e. the fiber types of the optical fiber links, the underlying optical link infrastructures, the modulation types, the data rate and error correction capabilities. The passive pre-calculated network rules employed in a conventional network can only provide a passive inflexible reaction diminishing the performance of the optical network. Accordingly, there is a need to provide a method and apparatus for optimizing dynamically the performance of an optical network to react dynamically to changes within the optical network.

SUMMARY

The invention provides according to the first aspect an apparatus for optimizing dynamically the performance of an optical network, wherein said apparatus comprises: at least one learning engine adapted to update a learning model in response to network metrics of said optical network collected during operation of said optical network, wherein the updated learning model is used to generate channel rank information for network channels, and a recommendation engine adapted to change a network channel throughput, a signal path and/or a spectral location of at least one network channel based on the channel rank information generated by the learning model of said learning engine.

In a possible embodiment of the apparatus according to the first aspect of the present invention, the recommendation engine of said apparatus is adapted to calculate suitable signal paths for network channels and/or suitable spectral locations for network channels based on aggregated and/or combined channel rank information generated by the updated learning model of said at least one learning engine for the respective network channels.

In a further possible embodiment of the apparatus according to the first aspect of the present invention, the learning model of said at least one learning engine comprises an artificial neural network trained in a training phase with training data.

In a further possible embodiment of the apparatus according to the first aspect of the present invention, the network channel throughput of at least one network channel is adjusted according to recommendations provided by said recommendation engine by altering channel characteristics of the respective network channel including transmission rate characteristics, in particular symbol rates and/or payload rates, modulation format characteristics, signal constellation characteristics and/or error correction characteristics.

In a further possible embodiment of the apparatus according to the first aspect of the present invention, the network metrics are monitored, collected and logged in real time during operation of said optical network and comprise single or multi-layer metrics.

In a further possible embodiment, the network metrics comprise configuration metrics, in particular spectral efficiency, amplifier types, fiber types, accumulated dispersion information and/or grid information.

In a further possible embodiment of the apparatus according to the first aspect of the present invention, the network metrics comprise operational metrics, in particular power supply levels, shelf temperature, laser temperature and humidity.

In a further possible embodiment of the apparatus according to the first aspect of the present invention, the network metrics comprise device metrics of network devices, in particular laser wavelength, amplifier noise, fiber loss, ROADM drift.

In a further possible embodiment of the apparatus according to the first aspect of the present invention, the network metrics comprise system metrics, in particular bit error rate, optical signal-to-noise ratios, Q-factor, non-linear noise and/or transceiver power.

In a further possible embodiment of the apparatus according to the first aspect of the present invention, the training data used for training the learning model of said learning engine comprises training data derived initially from span data of optical spans stored in span tables and/or from network planning data augmented during operation of said optical network by training data monitored, collected and logged from deployed network segments of said optical network.

In a further possible embodiment of the apparatus according to the first aspect of the present invention, the network channel throughput, signal path and/or spectral location of a network channel is changed according to recommendations provided by the recommendation engine depending on the channel rank information of the respective network channel itself and/or depending on the channel rank information of other copropagating neighboring network channels located in the signal spectrum close to the respective network channel according to a predefined policy.

In a still further possible embodiment of the apparatus according to the first aspect of the present invention, the recommendation engine is adapted to determine for each network channel a number of channels copropagating on the same optical span along a signal path within said optical network and to calculate a channel density of network channels per optical span of the signal path.

In a further possible embodiment of the apparatus according to the first aspect of the present invention, the recommendation engine is adapted to optimize a network channel throughput of at least one network channel whose channel rank information indicates a highest channel rank and/or having the lowest determined number of copropagating network channels and/or whose signal path comprises the lowest calculated channel density.

In a still further possible embodiment of the apparatus according to the first aspect of the present invention, the recommendation engine of said apparatus is adapted to recommend a best path and/or spectral location of at least one network channel based on aggregated channel rank information. In a possible embodiment, the recommended path and/or spectral location is supplied by the recommendation engine to an RWA engine. In a still further embodiment, the RWA engine or another execution engine is adapted to route an additional network channel and/or to reroute an existing network channel along the recommended signal path through said optical network based on aggregated and/or combined channel rank information generated by the learning model of the at least one learning engine and based on topology information of the network topology of said optical network stored in a topology database.

In a still further possible embodiment of the apparatus according to the first aspect of the present invention, the execution engine is adapted to allocate an additional network channel and/or to reallocate an existing network channel to the recommended suitable spectral location according to a received recommendation generated by the recommendation engine which is based on aggregated and/or combined channel rank information generated by the learning model of the at least one learning engine.

In a possible embodiment of the apparatus according to the first aspect of the present invention, the optical network having a performance optimized by the apparatus comprises a plurality of network segments each having network nodes connected to each other via optical spans.

In a further possible embodiment of the apparatus according to the first aspect of the present invention, a learning model is updated continuously by the at least one learning engine and exchanged and/or shared amongst different network segments of said optical network for initiating optimizations and/or in-operation training.

In a further possible embodiment of the apparatus according to the first aspect of the present invention, the network metrics of one or more network segments of said optical network are monitored, collected and logged in a common network metric database of said optical network and used to update continuously the learning model of the at least one learning engine.

In a further possible embodiment of the apparatus according to the first aspect of the present invention, the recommendation engine of said apparatus is integrated in a central controller of said optical network and is triggered to control an adjustment of the network channel throughput, the signal path and/or the spectral location of the at least one network channel every time the learning model is updated by the learning engine in response to logged network metrics of said optical network.

In a possible embodiment, the recommendation engine of said apparatus is integrated in a central SDN controller of the optical network.

In a further possible embodiment of the apparatus according to the first aspect of the present invention, the execution engine of the apparatus is adapted to adjust a network channel throughput, a signal path and/or a spectral location of at least one network channel continuously and gradually to absorb abrupt changes of monitored metrics of said optical network collected in real time during operation of said optical network.

In a further possible embodiment of the apparatus according to the first aspect of the present invention, the at least one learning engine of said apparatus is integrated in a central controller and/or in a network management system of a network segment of said optical network and/or in a network control unit and/or in a shelf control unit located at a node site of a network node.

In a further possible embodiment of the apparatus according to the first aspect of the present invention, the network metrics of the optical network are continuously monitored, collected and logged in real time to provide a quality metric vector applied to the learning model of the at least one learning engine.

In a still further possible embodiment of the apparatus according to the first aspect of the present invention, the optical network comprises several hierarchy network layers comprising a control layer including a central network controller of said optical network, a network segment layer including several connected network segments of the optical network each having a network management system entity and comprising a network node layer including network nodes each comprising a node control unit and/or a shelf control unit.

In a still further possible embodiment of the apparatus according to the first aspect of the present invention, channel rank information generated by a learning model of a learning engine implemented on a lower network layer is pushed during operation of the optical network in regular time intervals or event-driven via an exchange interface up to a learning engine implemented in an upper network layer of said optical network to provide a backup of the channel ranking information of the lower network layer.

In a still further possible embodiment of the apparatus according to the first aspect of the present invention, if a failure of an entity occurs in a lower network layer of said optical network, the learned model is recovered for said lower network layer by pushing in a recovery mode the backup channel ranking information of the lower network layer from a learning engine of an upper network layer via an exchange interface down to a learning engine of the lower network layer.

In a further possible embodiment of the apparatus according to the first aspect of the present invention, the channel rank information for a network channel is generated periodically in regular time intervals or event-driven in irregular time intervals by the learning model of the at least one learning engine.

In a further possible embodiment of the apparatus according to the first aspect of the present invention, each network channel of the optical network comprising a performance optimized by the apparatus comprises one or several carriers.

In a still further possible embodiment of the apparatus according to the first aspect of the present invention, the channel rank information of a network channel indicates a performance margin of the respective network channel and forms a unified metric for network optimization.

In a still further possible embodiment of the apparatus according to the first aspect of the present invention, the network channel carries an end-to-end signal to transport data traffic from a source node via a signal path including at least one optical span to a destination node of said optical network.

In a still further possible embodiment of the apparatus according to the first aspect of the present invention, the execution engine of said apparatus is further adapted to change a network channel throughput, a signal path and/or a spectral location of at least one network channel based on individual and/or aggregated channel rank information to provide a local and/or a global optimization of the operation of said optical network.

The invention further provides according to a second aspect a method for optimizing dynamically the performance of an optical network comprising the features of claim 22.

The invention provides according to the second aspect a method for optimizing dynamically the performance of an optical network comprising the steps of:

updating a learning model in response to network metrics of said optical network collected during operation of said optical network, generating channel rank information for network channels by the updated learning model and changing a channel throughput, a signal path and/or a spectral location of at least one network channel based on the generated channel rank information.

The invention further provides according to a further aspect a SDN network controller of an optical network comprising an apparatus for optimizing dynamically the performance of the respective optical network comprising the features of claim 1.

BRIEF DESCRIPTION OF FIGURES

In the following, possible embodiments of the different aspects of the present invention are described in more detail with reference to the enclosed figures.

FIG. 16 illustrates a table of potential input parameters for a learning engine of an apparatus according to the first aspect of the present invention.

DETAILED DESCRIPTION OF EMBODIMENTS

Figure 1:
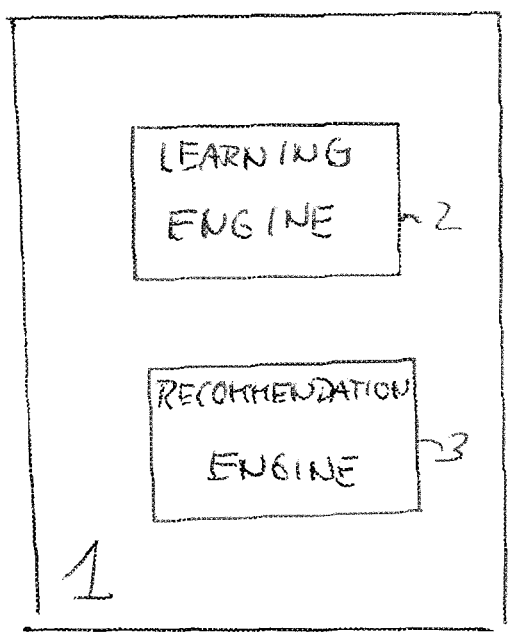
FIG. 1 shows a block diagram of a possible exemplary embodiment of an apparatus for optimizing dynamically the performance of an optical network according to the first aspect of the present invention.
Figure 3:
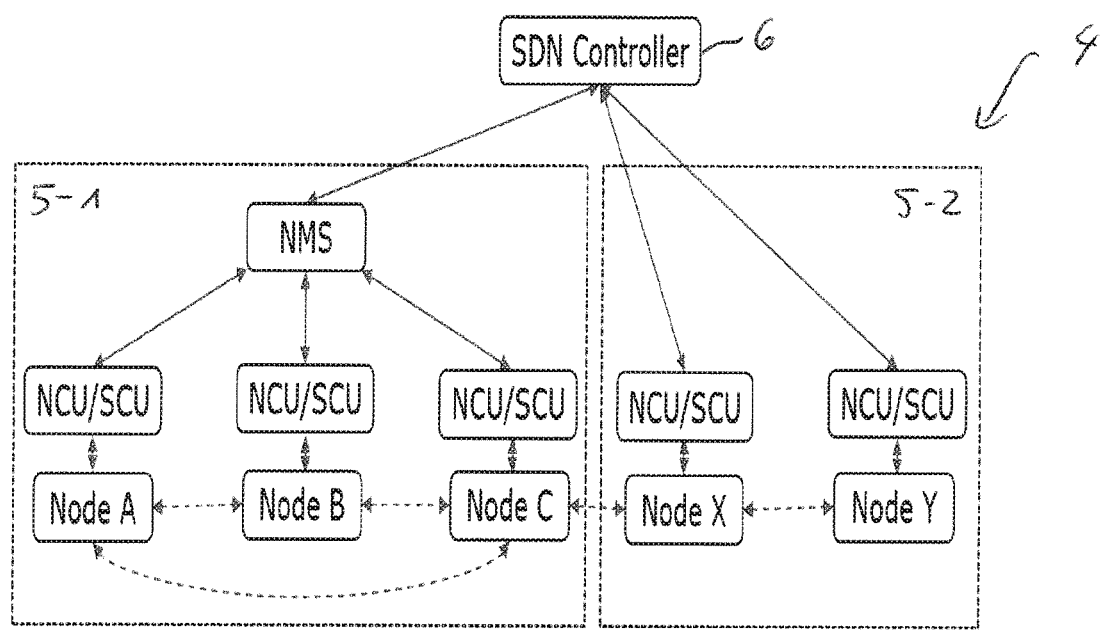
FIG. 3 illustrates an exemplary optical network where the apparatus and network according to the present invention can be used.

As can be seen in the block diagram of FIG. 1, an apparatus 1 according to the first aspect of the present invention used for optimizing dynamically the performance of an optical network comprises in the illustrated exemplary embodiment two main components, i.e. at least one learning engine 2 and a recommendation engine 3. The learning engine 2 is adapted to update a learning model in response to network metrics of the optical network 4. These network metrics are collected during operation of the optical network 4 such as illustrated in FIG. 3. The updated learning model is used to generate channel rank information of network channels. A network channel carries an end-to-end signal to transport data traffic from a source node via a signal path including at least one optical span to a destination node of the optical network 4. The network channel can comprise one or several carriers.

The recommendation engine 3 of the apparatus 1 is adapted to generate or calculate a recommendation for a best signal path and/or best spectral location of at least one network channel based on aggregated channel rank information. The calculated recommendation for a best suited signal path and/or best suited spectral location are supplied by the recommendation engine 3 to an execution engine such as the RWA unit 13-CC illustrated in FIG. 4. The execution engine is adapted to change a network channel throughput, a signal path and/or a spectral location of at least one network channel in response to the received recommendation based on the channel rank information generated by the learning model of the learning engine 2. The recommendation engine 3 of the apparatus 1 can calculate recommendations for suitable signal paths for network channels based on aggregated and/or combined channel rank information provided by the updated learning model of the at least one learning engine 2 for the respective network channels. The recommendation engine 3 is in a further embodiment further adapted to calculate recommendations for suitable spectral locations for network channels based on aggregated and/or combined channel rank information provided by the updated learning model of the learning engine 2.

In a possible embodiment, the learning model of the learning engine 2 comprises an artificial neural network ANN which can be trained in a possible embodiment in a training phase using training data. This training data can in a possible embodiment be derived from span tables and/or network planning data. The training data used for training the learning model of the learning engine 2 can comprise in a possible embodiment training data derived initially from span data of optical spans stored in span tables and/or from network planning data augmented during operation of said optical network 4 by training data monitored, collected and logged from deployed network segments of said optical network 4.

The recommendation engine 3 of the apparatus 1 is adapted to calculate recommendations for suitable signal paths for network channels and/or suitable spectral locations for network channels based on the received channel rank information generated by the updated learning model of the learning engine 2. In a possible embodiment, the network channel throughput of at least one network channel of the optical network 4 can be adjusted by the execution engine by altering different channel characteristics of the respective network channel. These channel characteristics can include transmission rate characteristics, in particular symbol rates and/or payload rates. Further, the channel characteristics altered by the execution engine can comprise modulation format characteristics, signal constellation characteristics and/or error correction characteristics. The network metrics of the optical network 4 are monitored, collected and logged in real time during operation of the optical network 4 and supplied to the learning engine 2 of the apparatus 1.

The network metrics of the optical network 4 can comprise single or multi-layer metrics. The different network metrics monitored, collected and logged in real time during operation of the optical network 4 and supplied to the learning engine 2 of the apparatus 1 can comprise configuration metrics, operational metrics, device metrics of network devices and system metrics.

The configuration metrics can for instance comprise spectral efficiency, amplifier types, fiber types, accumulated dispersion information and/or grid information.

The operational metrics applied to the learning model of the learning engine 2 can comprise for instance power supply levels, shelf temperature, laser temperature, or humidity. Further, the device metrics of network devices can for instance comprise laser wavelength, amplifier noise, fiber loss or ROADM drifts.

Moreover, network metrics can comprise system metrics, in particular bit error rates, optical signal-to-noise ratios, Q-factors and/or non-linear noise and/or transceiver power.

The network channel throughput of a network channel, a signal path and/or a spectral location of a network channel is changed by the execution engine of the apparatus 1 in a possible embodiment according to the received recommendations depending on channel rank information of the respective network channel itself and/or depending on channel rank information of other copropagating neighboring network channels which can be located in the signal spectrum close to the respective network channel according to a predefined policy. The recommendation engine 3 of the apparatus 1 can be adapted to determine for each network channel a number of channels copropagating on the same optical span along a signal path within the optical network 4 and can be further adapted to calculate a channel density of network channels per each optical span of the signal path. The recommendation engine 3 of the apparatus 1 is adapted in a further embodiment to optimize a network channel throughput of at least one network channel whose channel rank information indicates a highest channel rank and/or having a lowest determined number of copropagating network channels and/or whose signal path comprises the lowest calculated channel density.

The execution engine of the apparatus 1 illustrated in FIG. 1 is adapted to route an additional network channel and/or to reroute an existing network channel along a suitable signal path through said optical network according to the received recommendations based on channel rank information generated by the learning model of the at least one learning engine 2 and based on topology information of the network topology of the optical network 4 stored in a topology database. The used channel rank information can comprise aggregated and/or combined channel rank information. The execution engine of the apparatus 1 is adapted to allocate an additional network channel and/or to reallocate an existing network channel in a further possible embodiment to a suitable spectral location according to the received recommendations based on the aggregated and/or combined channel rank information generated by the learning model of the learning engine 2.

The learning engine 2 receives network metrics on the optical network 4. In a possible embodiment, the learning model of the learning engine 2 is updated continuously by the learning engine 2 and exchanged and/or shared amongst different network segments of the optical network 4 for initiating optimizations and/or in-operation training. In a possible embodiment, one or more network segments of the optical network 4 can be monitored, collected, logged in a common network metric database of the optical network 4 and used to update continuously the learning model of the learning engine 2.

In a possible embodiment, the recommendation engine 3 is integrated in a central controller of the optical network 4. The recommendation engine 3 can be for instance integrated in a SDN controller of the optical network 4. In a further possible embodiment, both the learning engine 2 and the recommendation engine 3, i.e. the whole apparatus 1, is integrated in a central controller of the optical network 4. The recommendation engine 3 can be triggered to control an adjustment of the network channel throughput, an adjustment of the signal path and/or an adjustment of the spectral location of the at least one network channel every time the learning model is updated by the learning engine 2 in response to logged network metrics of the optical network 4. In a possible embodiment, the recommendation engine 3 of the apparatus 1 is further adapted to provide recommendations to adjust a network channel throughput, the signal path and/or the spectral location of at least network channel continuously and to gradually absorb abrupt changes of monitored metrics of the optical network 4 collected in real time during operation of the optical network 4.

In a possible embodiment, the learning engine 2 is also integrated in the central controller, in particular in a SDN controller of the optical network 4. Alternatively, the learning engine 2 can also be integrated in a network management system NMS of a network segment forming part of the optical network 4. In a still further possible implementation, the learning engine 2 can also be integrated in a network control unit NCU or in a shelf control unit SCU located at a node site of a network node of the optical network 4.

In a possible embodiment, the different network metrics of the optical network 4 can be continuously monitored, collected and logged in real time to provide a quality metric vector applied to the learning model of the at least one learning engine 2 located at the central controller, the network management system, the network control unit NCU and/or in a shelf control unit SCU of the network.

The optical network 4 comprising the apparatus 1 as illustrated in FIG. 1 can comprise several hierarchy network layers. In a possible embodiment, the optical network 4 comprises at least three main layers including a control layer, a network segment layer and a network node layer. The control layer of the hierarchical optical network 4 includes a central network controller of the optical network 4. The network segment layer of the optical network 4 can include several connected network segments of the optical network 4 each having a network management system NMS entity. The network layer of the optical network 4 having a performance optimized by the apparatus 1 illustrated in FIG. 1 can include network nodes each comprising a node control unit NCU and/or a shelf control unit SCU.

In a possible embodiment, channel rank information generated by a learning model of the learning engine 2 implemented in a lower network layer can be pushed during operation of the optical network 4 in regular time intervals or event-driven via an exchange interface up to a learning engine 2' implemented in an upper network layer of said optical network 4 to provide a backup of the channel ranking information of the lower network layer. Further, if a failure of an entity occurs in a lower network layer of the optical network 4, the learned model is recovered for said lower network layer by pushing in a recovery mode the backup channel ranking information of the lower network layer from a learning engine 2 of an upper network layer via an exchange interface down to a learning engine 2 of the lower network layer.

The channel rank information for a network channel can be generated periodically in regular time intervals. Alternatively, the channel rank information for a network channel can also be generated event-driven in irregular time intervals by the learning model of the at least one learning engine 2. The channel rank information of a network channel can indicate a performance margin of the respective network channel which forms a unified metric for network optimization used by the apparatus 1 according to the first aspect of the present invention. The recommendation engine 3 of the apparatus 1 is adapted to change a network channel throughput, a signal path and/or a spectral location of at least one network channel based on individual and/or aggregated channel rank information to provide a local and/or a global optimization of the operation and/or performance of the optical network 4.

Figure 2:
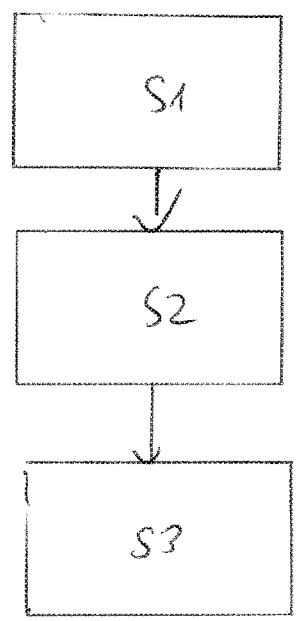
FIG. 2 shows a flowchart of a possible exemplary embodiment of a method for optimizing dynamically the performance of an optical network according to the second aspect of the present invention.

FIG. 2 illustrates a flowchart of a possible exemplary embodiment of a method for optimizing dynamically the performance of an optical network 4 according to the second aspect of the present invention.

In the illustrated exemplary embodiment, the method comprises three main steps.

In a first step S1, a learning model is updated in response to network metrics of the optical network 4 collected during operation of the optical network 4.

In a further step S2, channel rank information for network channels is generated by the updated learning model.

In a further step S3, a channel throughput, a signal path and/or a spectral location of at least one network channel is changed dynamically based on the generated channel rank information. The method as illustrated in FIG. 2 can be performed in a possible embodiment by the apparatus 1 illustrated in FIG. 1.

FIG. 3 shows a schematic diagram of a typical optical network 4 where the method and apparatus according to the present invention can be employed. In the illustrated embodiment, the optical network 4 comprises a central controller 6 formed by an SDN controller for different network segments 5-1, 5-2 of the optical network 4. In the illustrated exemplary embodiment of FIG. 3, the optical network 4 comprises two network segments 5-1, 5-2 connected to a central control unit 6 which can be formed by an SDN controller. The first network segment 5-1 of the optical network 4 comprises a network management system NMS to which node control units NCU and/or shelf control units SCU are connected. The shelf control unit SCU and the node control unit NCU can be physically located at node sites of network nodes. In the illustrated exemplary topology of FIG. 3, the first network segment 5-1 of the optical network 4 comprises three network nodes A, B, C. The second network segment 5-2 of the optical network 4 comprises nodes X, Y. The solid lines illustrated in FIG. 3 illustrate a control traffic exchanged between different entities, whereas the dashed lines illustrate fiber connections between different network nodes. In the optical communication network 4 illustrated in FIG. 3, different network nodes are interconnected, configured and can be managed through different control systems. The optical network 4 itself is served by the central SDN controller 6 with underlying network management systems NMS from different network segments 5-$i$. Further below, each network management system NMS can be fed by a shelf control unit SCU and/or a node control unit NCU located at the node sites. Several learning systems can be employed for partial framework execution, however, they share information with the central recommendation engine 3 of the apparatus 1 for global analysis. The apparatus 1 for optimizing dynamically the performance of the optical network 4 illustrated in FIG. 3 can in a possible embodiment be integrated in the central SDN controller 6 comprising both a recommendation engine 3 and a learning engine 2. In an alternative embodiment, the learning engine 2 can also be integrated in other entities such as the network management system NMS and/or in a node control unit NCU. The centralized controller 6 comprising the apparatus 1 can predict the best signal path or network channel and provides potentially spectral slot configuration to local management systems, and consequently to the transceivers. The throughput of an optical channel can then be optimized in real time performing the method according to the present invention as illustrated in FIG. 2.

Figure 4:
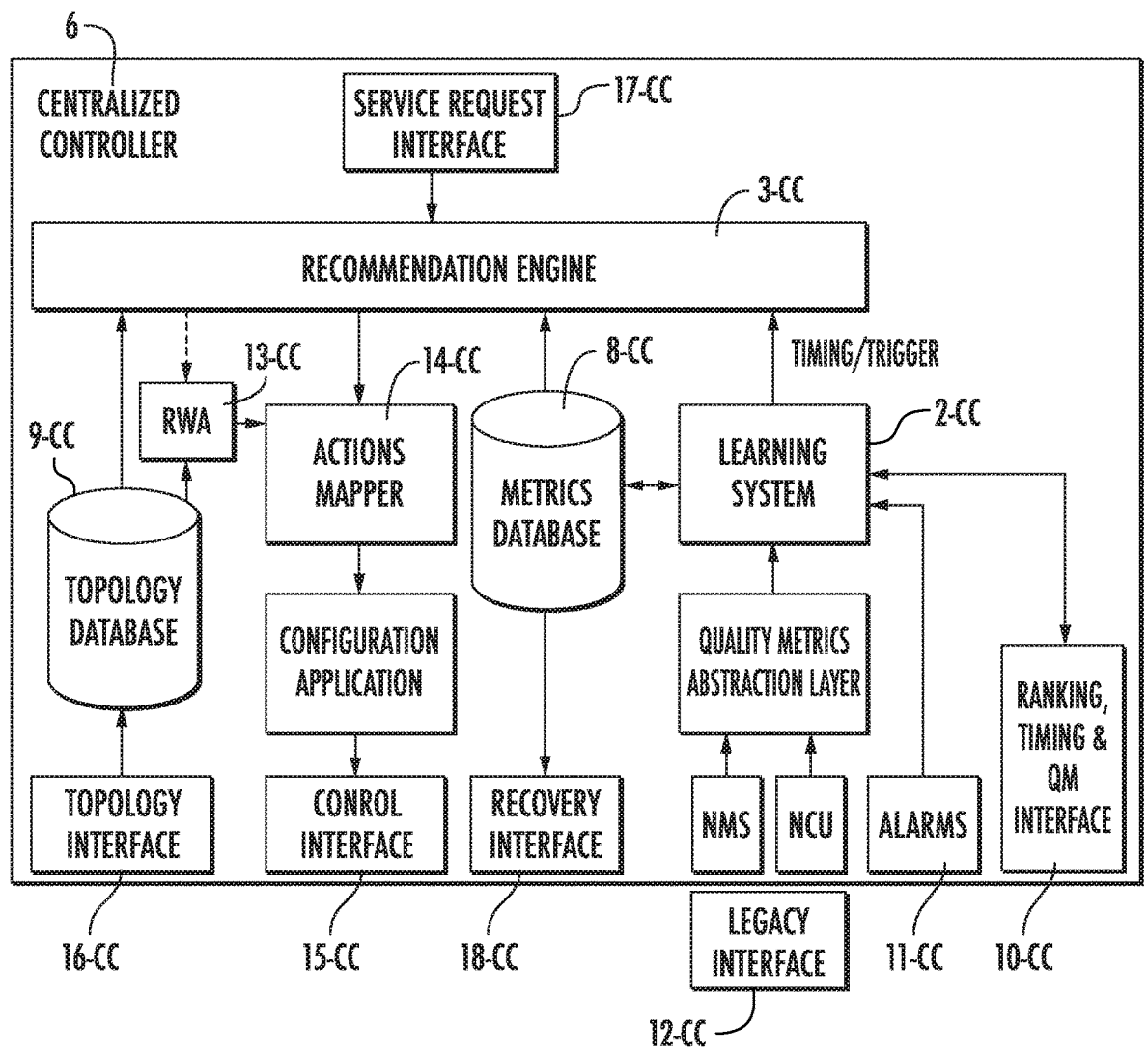
FIG. 4 shows a schematic block diagram of a central controller where an apparatus according to the present invention can be implemented.

FIG. 4 illustrates schematically a possible exemplary embodiment of a central controller (CC) 6 implemented in an optical network 4 as shown in FIG. 3. The centralized or central controller CC can comprise an SDN controller 6 having different components. In a possible embodiment, the learning engine 2 and the recommendation engine 3-CC can be located at the central SDN controller 6 as shown in FIG. 4. The input network metrics can be fed into the centralized controller 6 through respective interfaces from the node control unit NCU and/or network management entity NMS. The input network metrics can be initially used for training of a learning model of the learning engine 2. This learning model can comprise an artificial neural network ANN with several artificial network layers. In a possible embodiment, the artificial neural network ANN comprises a deep neural network. The input network metrics can then be used to generate channel rank information for network channels of the optical network such as the optical network 4 illustrated in FIG. 3. In a possible embodiment, after the artificial neural network ANN has been trained, the learned updated artificial neural network ANN is used to generate continuously channel rank information for different network channels of the optical network 4. The generated channel rank information can be stored temporarily or permanently in a memory or database. In the illustrated embodiment of FIG.

4, the learning engine 2 and the recommendation engine 3 have access to a common network metrics database or network metrics memory 8-CC of the central controller (CC) 6. The recommendation engine 3 of the centralized controller 6 has further access to a topology database 9-CC comprising information about the network topology of the optical network 4. In the illustrated embodiment of FIG. 4, the learning engine 2 can receive channel ranking information and/or timing information via an interface 11-CC from underlying network layers. Further, the learning engine 2 can be triggered by alarm messages received via a corresponding interface. The centralized controller (CC) 6 illustrated in FIG. 6 further comprises legacy interfaces 12-CC to receive metrics from at least one network management system NMS or from network control units NCU. The network metrics can comprise quality metrics indicating a quality of a network channel. The recommendation engine 3 is further connected in the illustrated embodiment to an RWA unit 13-CC for providing routing wavelength assignment forming the execution engine. Further, the recommendation engine 3 can be connected to an internal actions mapper 14-CC to provide configuration applications which may be output via a control interface 15-CC of the centralized controller (CC) 6. The topology memory or database 9-CC of the centralized controller 6 can comprise a topology interface 16-CC to receive topology data of an optical network under investigation. The recommendation engine 3 can further have a service request interface 17-CC to receive service requests from an application. The recommendation engine 3 is adapted to initiate a change of a network channel throughput, a change of a signal path and/or a change of a spectral location of at least one network channel based on the channel rank information calculated by the learning model of the learning engine 2. The recommendation engine 3 can calculate possible proposed throughput changes which may be pushed down using the configuration distribution and control interfaces 15-CC of the centralized controller (CC) 6. Furthermore, a new service may also use the output recommendation of the recommendation engine 3 to optimize optimum available signal path and spectral locations. The learning information can be shared at the SDN layer for global network optimization. In the illustrated framework of FIG. 4, a recovery interface 18 allows for configuration restoration in case that a device memory failure occurs. The embodiment illustrated in FIG. 3 allows for event-triggered learning and recommendation system operations as well as for timing optimization for various system operations.

Figure 5:
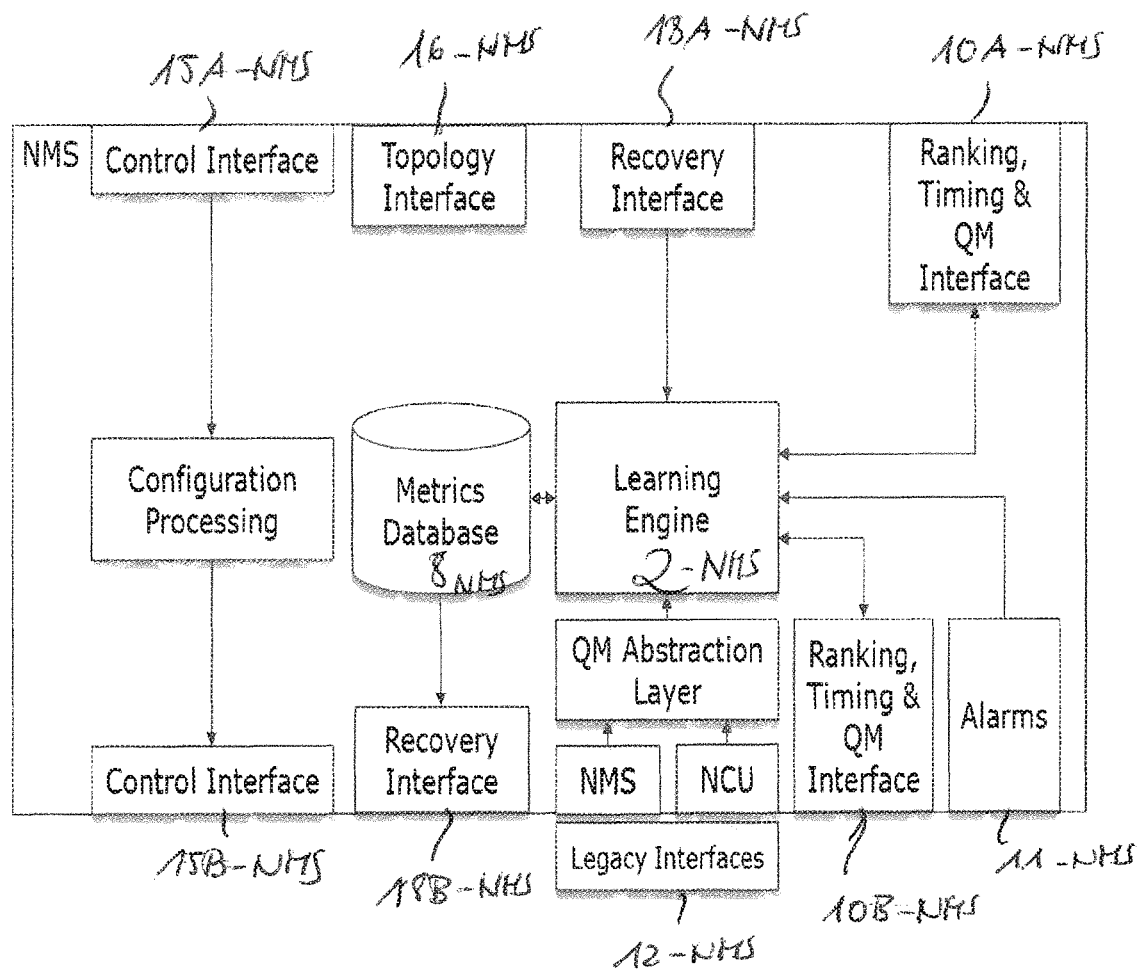
FIG. 5 shows a schematic block diagram of a network management system of a network segment where a learning engine forming part of the apparatus according to the first aspect of the present invention can be implemented.

FIG. 5 shows a schematic diagram for illustrating a possible exemplary embodiment of a network management system NMS entity which can be provided in a network segment such as network segment 5-1 of the optical network 4 illustrated in FIG. 3. In the illustrated embodiment, the network management system entity NMS comprises an integrated learning engine 2 which may be similar to a learning engine 2 provided in the central control unit 6 shown in FIG. 4.

Figure 6:
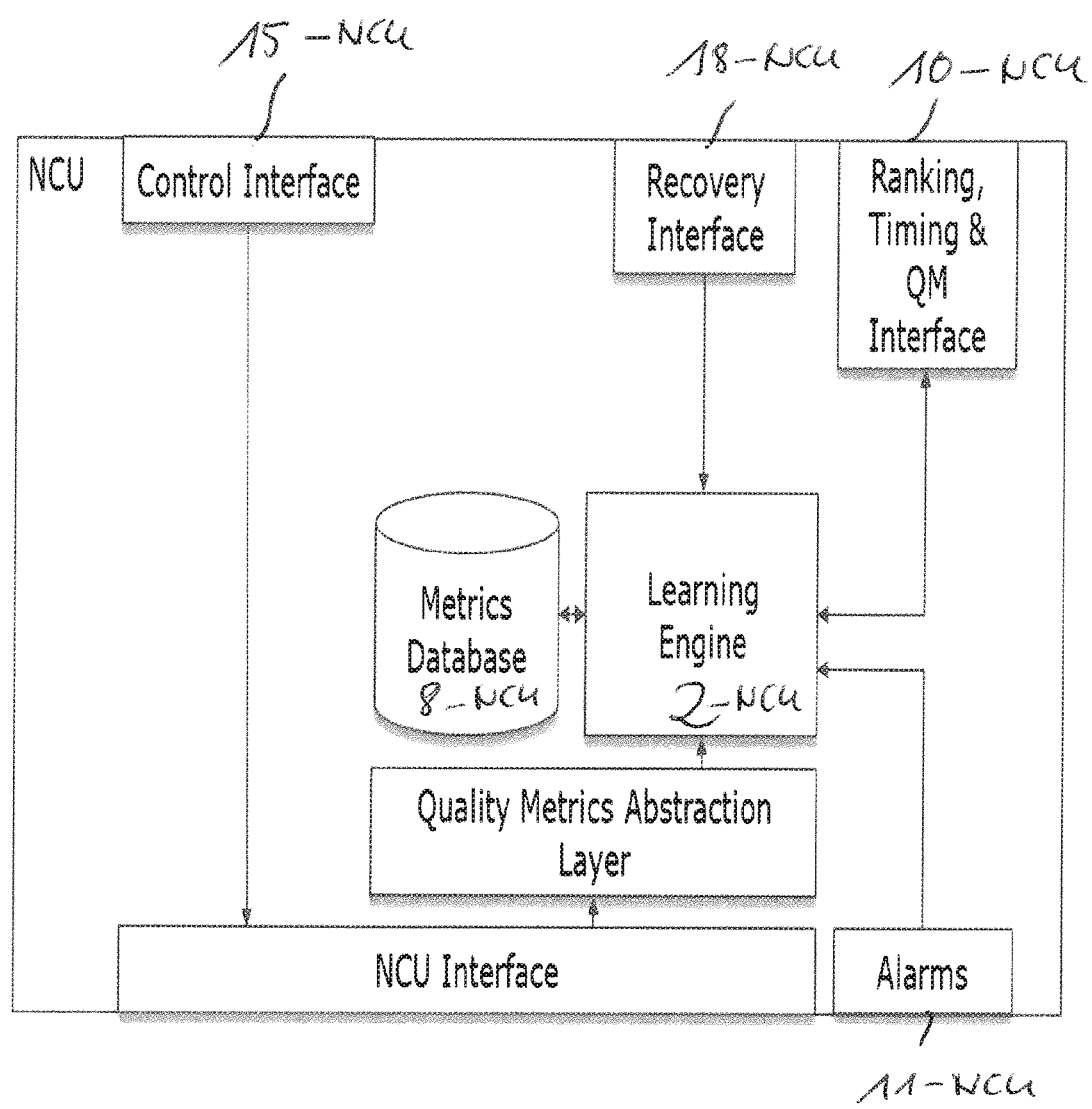
FIG. 6 illustrates a schematic block diagram of a network control unit at a network node site where the learning engine forming part of the apparatus according to the first aspect of the present invention can be implemented.

Further, FIG. 6 shows a block diagram of a possible exemplary embodiment of a node control unit NCU at a network node layer of the hierarchical optical network 4. In the illustrated embodiment of FIG. 3, the optical network 4 comprises three hierarchical network layers. The control layer of the optical network 4 includes the central network controller 6, and the network segment layer of the hierarchical network 4 includes several connected network segments 5 of the optical network 4 which may have a network management system NMS entity as illustrated in FIG. 5. Further, the network node layer of the hierarchical optical network 4 includes network nodes and each network node can comprise a node control unit NCU as illustrated in FIG. 6. The different entities illustrated in FIGS. 4, 5, 6 can exchange channel rank information for network channels via a ranking exchange interface 10. In a possible embodiment, a local learning engine 2 can share channel ranking information through their northbound interfaces for providing a global recommendation operation by the recommendation engine 3 integrated in the centralized controller 6 at the highest layer of the hierarchical optical network 4. On the other hand, in case of a configuration recovery mode, the channel rank information and associated learned information can be pushed down by one or various layers through the southbound interfaces of the respective entity.

Figure 7:
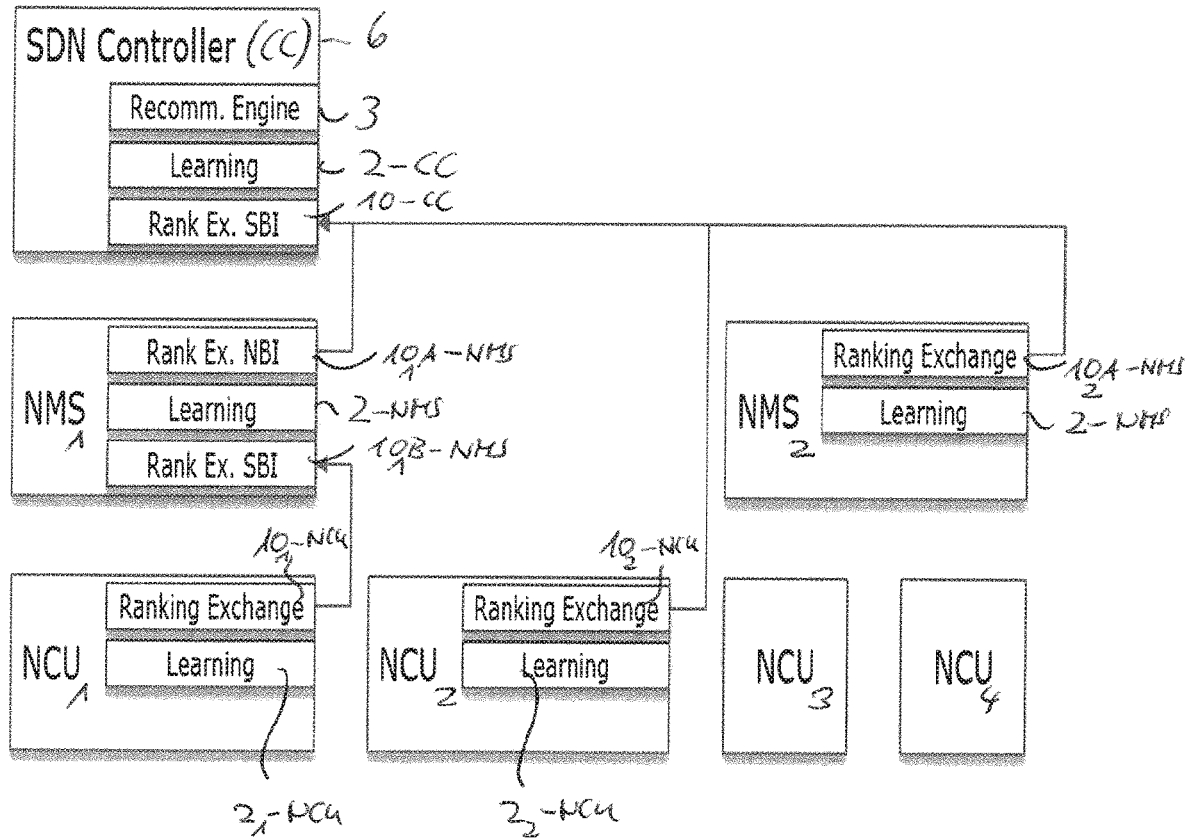
FIG. 7 illustrates a possible exemplary ranking information exchange architecture which can be employed in an optical network comprising the apparatus according to the first aspect of the present invention.

FIG. 7 illustrates a possible architecture of a hierarchical optical network 4 comprising different entities illustrated in FIGS. 4, 5, 6. In the illustrated embodiment of FIG. 7, the central controller 6 of the optical network 4 comprises the recommendation engine 3. In the illustrated embodiment, the central controller CC implemented by an SDN controller 6 comprises also a learning engine 2-CC. On the next layer of the optical network 4, two NMS entities $NMS_1$, $NMS_2$ are provided each comprising also a learning engine 2-NMS. On the lowest third node layer of the optical network 4, several node control units NCU ($NCU_1$, $NCU_2$, $NCU_3$, $NCU_4$) are provided and some of the node control units NCU ($NCU_1$, $NCU_2$) comprise learning engines 2-NCU as well. The different entities can comprise ranking exchange interfaces 10 to exchange channel rank information generated by updated learning models of the different learning engines 2.

Figure 8:
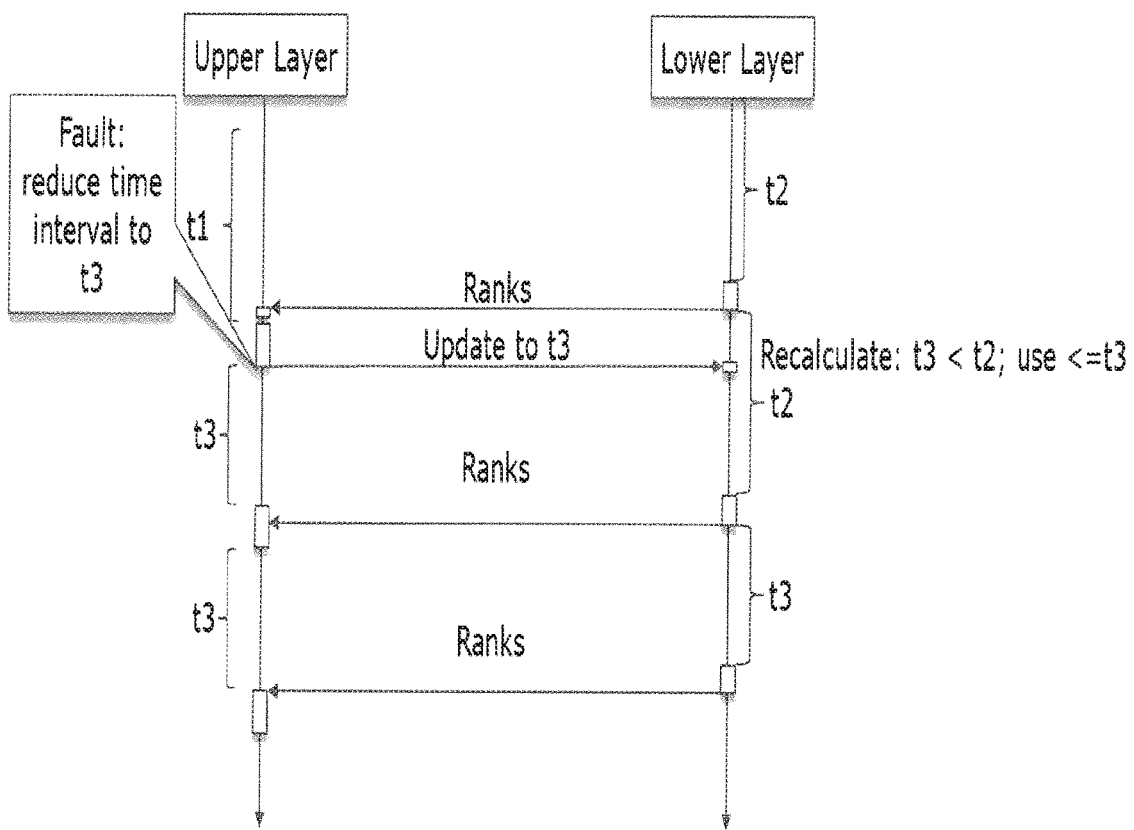
FIG. 8 shows a signal flow diagram to illustrate the exchange of rank information between different layers of an optical network.

FIG. 8 depicts an optimization flow for time intervals after which channel rank information data can be changed by local learning engines 2. In a possible embodiment, channel rank information generated by a learning model of a learning engine 2 implemented in a lower network layer of the optical network 4 is pushed during operation of the optical network 4 in regular time intervals or event-driven via an exchange interface up to a learning engine 2 implemented in an upper network layer of the optical network 4 to provide a backup of the channel rank information of the lower network layer.

Figure 9:
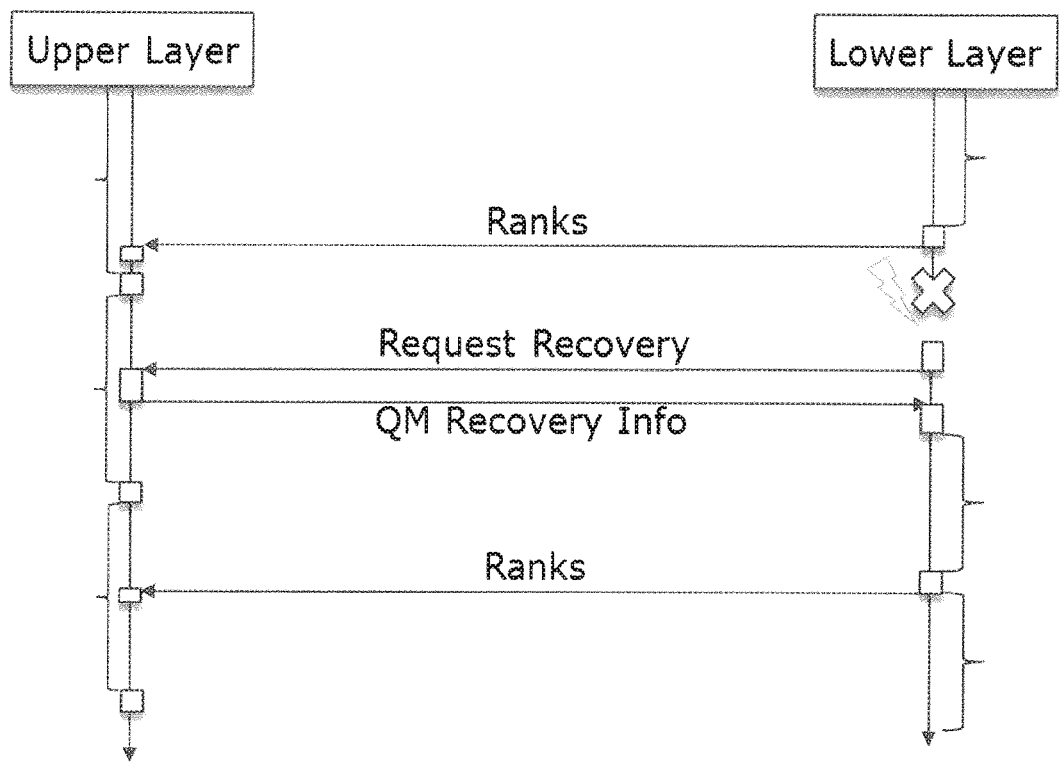
FIG. 9 shows a further flow diagram for illustration of a configuration recovery between different layers of an optical network.

FIG. 9 illustrates a configuration recovery in order to restore learning knowledge at a local level triggered for instance by a device failure. If a failure of an entity occurs in a lower network layer of the optical network 4, the learned model is recovered for said lower network layer by pushing in a recovery mode the backup channel ranking information of the lower network layer from a learning engine 2 of an upper network layer via an exchange interface down to a learning engine 2 of the lower network layer.

Figure 10:
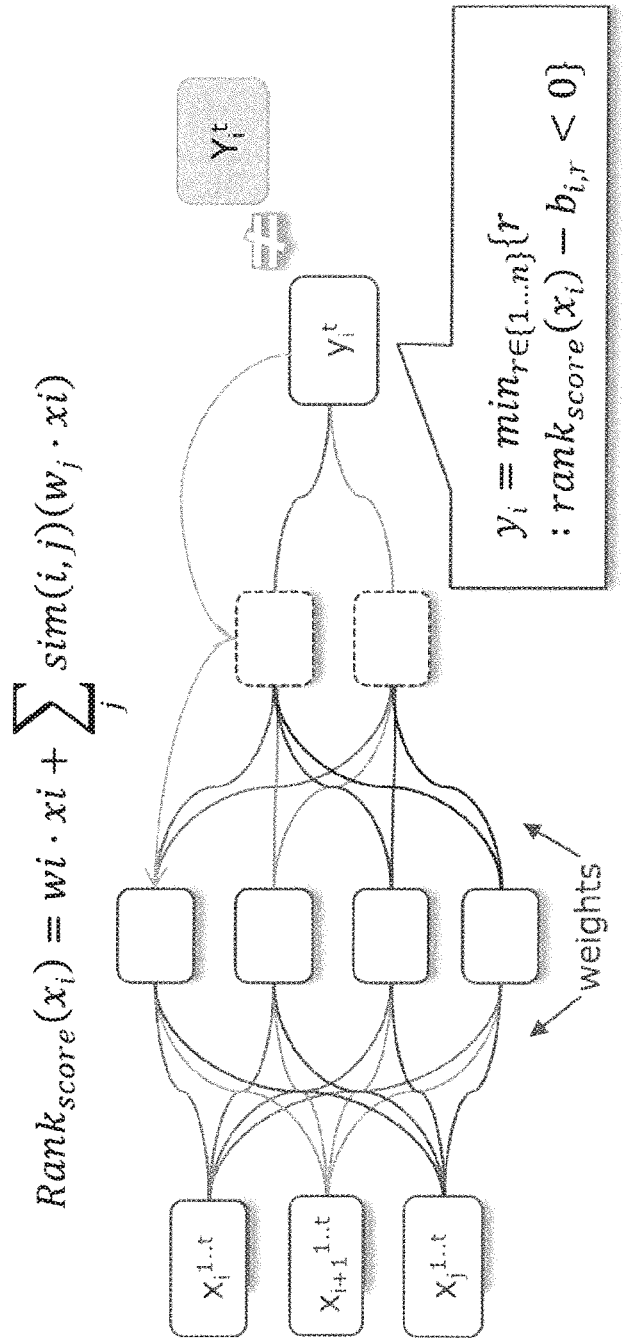
FIG. 10 illustrates a possible exemplary implementation of a learning engine forming part of an apparatus according to the first aspect of the present invention.

FIG. 10 illustrates schematically a possible exemplary implementation of a learning model used in a learning engine 2 of an apparatus 1 as illustrated in FIG. 1. In the illustrated embodiment, the learning engine can predict a rank $y \in \{1, \ldots, k\}$ for every input data $x \in R^n$, wherein x represents a quality metric vector with one or more network metric entries. In a possible embodiment, the different network metrics of the optical network 4 can be continuously monitored, collected and logged in real time to provide a quality metric vector applied to the learning model of the at least one learning engine 2. The learning model can store a weight vector $W \in R^n$, and in a possible embodiment a vector of boundaries $b0 = -\infty \leq b1 \leq \ldots \leq b_{k-1} \leq b_k = \infty$ which can divide a real line of k segments or one for each possible rank. $x^t$ is a feature vector in $R^n$ and the label $y^t$ can form a vector of k ranks in $Y^k$, where $Y = \{1, \ldots, k\}$ is a set of possible ranks used for training. The $i^{th}$ component of $x^t$ and $y^t$ can form the rank of the $i^{th}$ network channel and can be denoted by $yi^t$.

The recommendation engine 3 of the apparatus 1 can operate or enact on the rank input and decides for continuous throughput increments and decrements in a given granularity as illustrated below. The impact of neighboring traffic can also be considered before changing the throughput. The optimum signal paths and spectral locations can be derived using aggregated channel rank information data.

| Best Throughput |
| --- |
| Input: (x, y), . . . ,($x^t$, $y^t$), RankSegment(min, max)<br>Output:<br>Loop: For t = 1, 2, . . . , t:<br>  1.       Get a new instance yt<br>  2.       Compare ($y^t$, Ranksegment)<br>           If $y^t$ = max and Neighbors($y^t$)> min+delta<br>             increaseRate( )<br>           if $y^t$ = min<br>             DecreaseRate( )<br>End-Loop |

| Best Path and Spectra |
| --- |
| Input: (x, y, b), . . . ,($x^t$, $y^t$, $b^t$), p, c<br>Initialize: sumPRank = 0, sumThroughP = 0,<br>          minC = 0, maxC = 0<br>Output: bestPath,bestCvec,worstCvec,<br>          avgPRank[i], avgThroughP[i]<br>For i = 1, 2, . . . , p:<br>  For j = 1, 2, . . . , $c_p$:<br>    if similarityMeasure == TRUE then<br>      sumPRank[i]= sumPRank[i] + $y_i$<br>      sumThroughP[i]= sumThroughP[i] + $b_i$<br>    End<br>  End<br>  avgPRank[i]= avgPRank[i]/$c_p$<br>  avgThroughP[i]= avgThroughP[i]/$c_p$<br>End<br>bestPath = getindices(max(avgPRank AND<br>                          avgThroughP))<br>bestCvec= max($y_{bestP,j}$)<br>worstCvec= min($y_{bestP,j}$) |

In the routine illustrated on the left, a rank-based throughput optimization is depicted. In the routine illustrated on the right, the rank-based path and spectral location optimization is performed.

Figure 11:
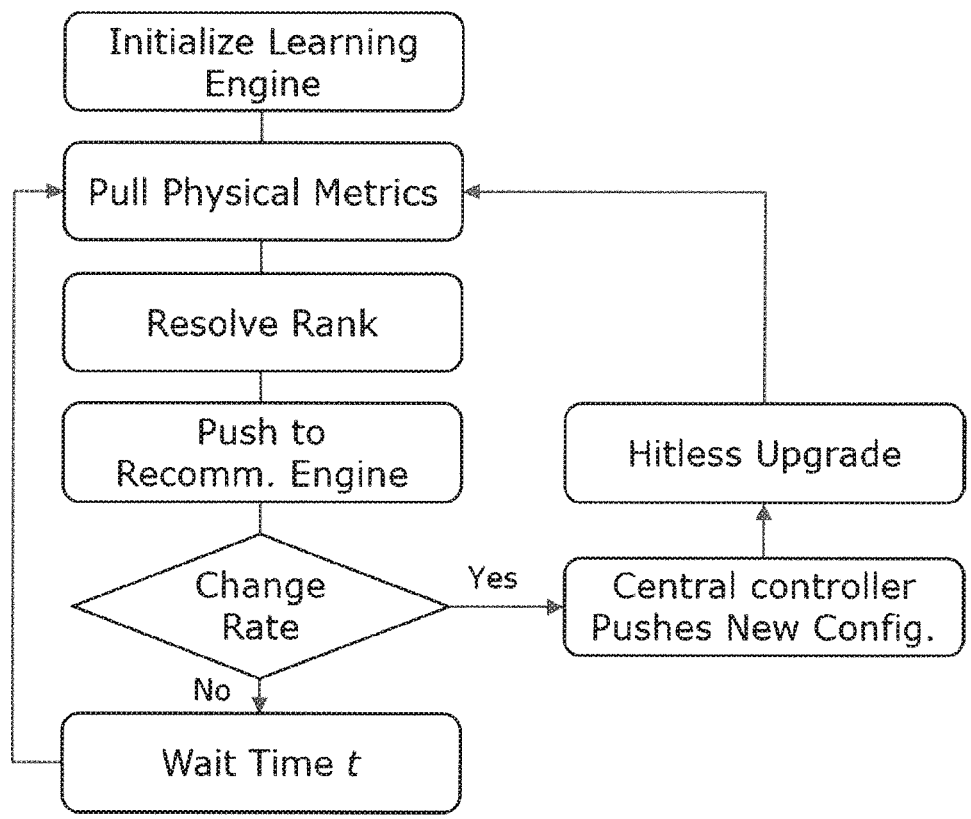
FIG. 11 shows a flowchart of a possible exemplary embodiment of a method according to an aspect of the present invention.

FIG. 11 illustrates a flowchart of a possible exemplary embodiment of a method according to the present invention. In a first step, the learning engine 2 can be initialized. In a further step, the physical network metrics of the optical network 4 can be pulled to resolve the ranking information in the next step. The pulled channel rank information can be pushed to the recommendation engine 3. In the illustrated implementation of FIG. 11, in a next step it is checked whether the transmission rate or capacity can be increased based on the channel rank information. If not, the process waits for a predefined time for pulling the next physical network metrics. If the capacity can be increased, the central controller 6 can push the new configuration and provide a hitless upgrade of the optical network 4.

Figure 12:
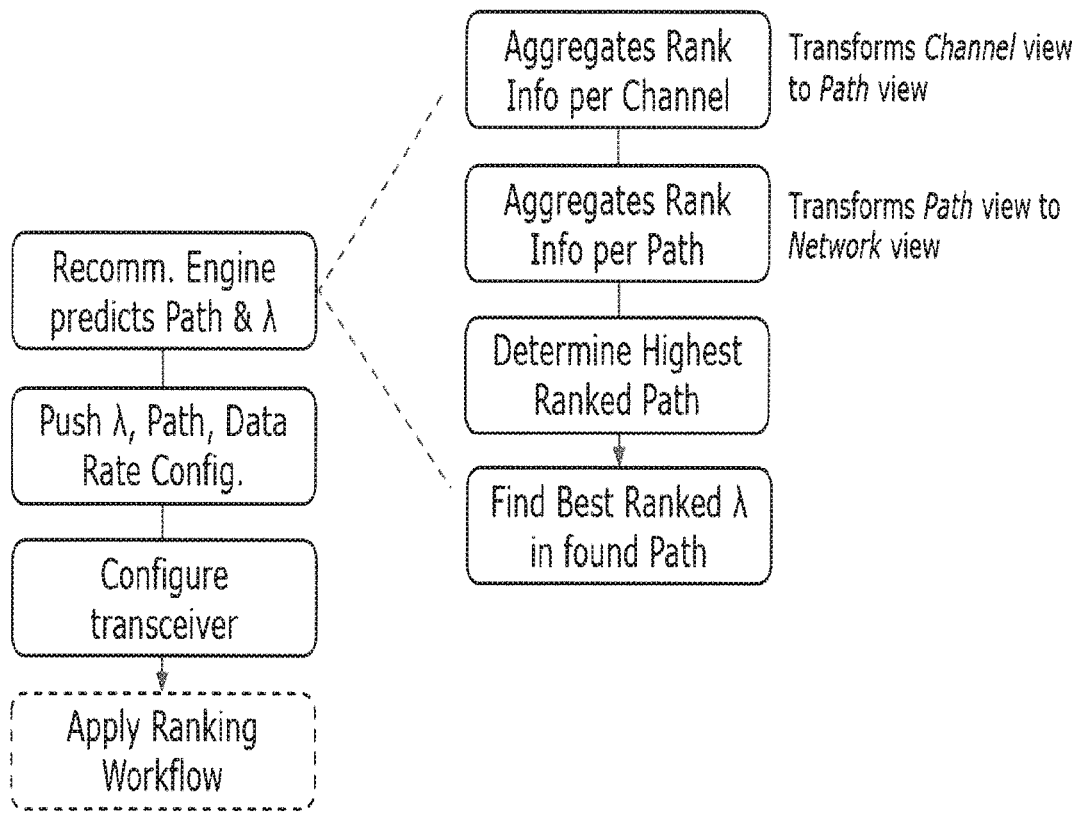
FIG. 12 illustrates a further typical workflow of a possible exemplary embodiment of the method according to the present invention.

FIG. 12 illustrates a further possible implementation of the method according to the present invention. In the illustrated flowchart of FIG. 12, a recommendation engine 3 can predict a signal path and a spectral location. In a possible implementation, the recommendation engine 3 can aggregate channel rank information for each network channel and can transform a channel view to a signal path view. Then, the channel rank information is aggregated for each signal path to transform a path view into a network view. In a further step, the recommendation engine 3 can determine the highest ranked signal path. In a further step, the recommendation engine 3 can find the best-ranked wavelength or network channel in the found highest ranked signal path. The found best-ranked network channel is pushed to the optical network 4 to reconfigure the optical network 4 accordingly. Further, the transceivers of the optical network 4 are configured accordingly and a ranking workflow is further applied.

In a possible embodiment, the optical network 4 can comprise a WDM network carrying for instance two optical network channels with a payload signal of 100 Gb/s each. The modulation format of choice for this application can be considered for example DP-16 QAM, representing an information rate of 4 bits/symbol/polarization.

Figure 13:
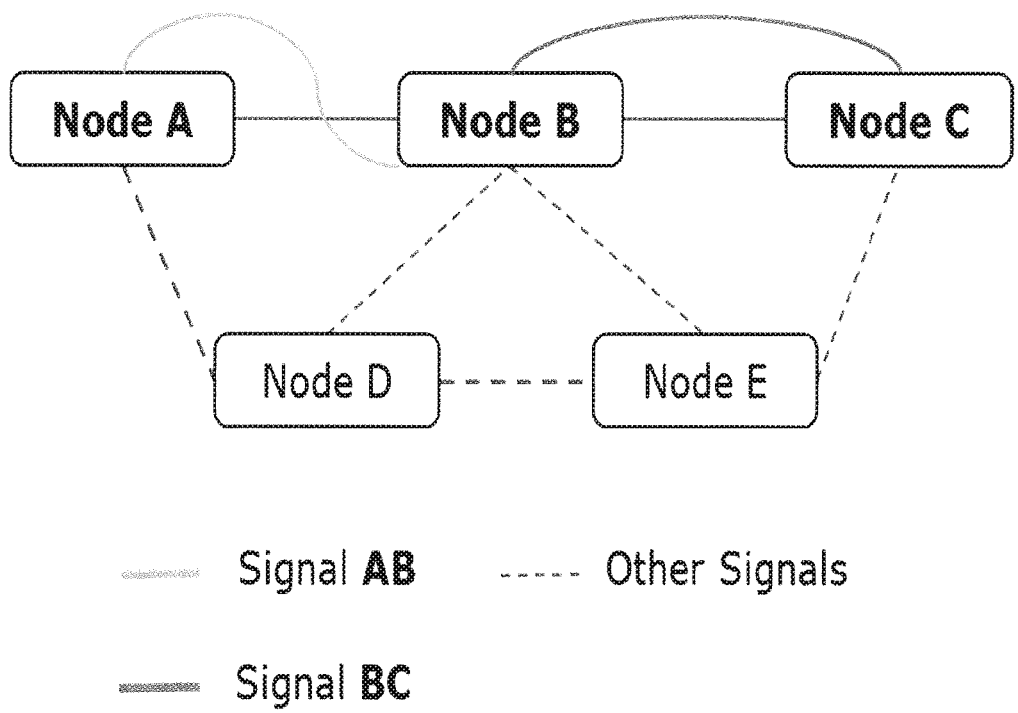
FIG. 13 illustrates a possible exemplary network topology of an optical network employing the method and apparatus according to the present invention.

FIG. 13 illustrates the network topology in an exemplary optical network 4 over which such a signal can traverse from node A to node B and from node B to node C hereafter termed as AB and BC.

The signal configuration parameters can be coarsely pulled from a network planning tool, whereas signal quality features can be continuously monitored via a network management tool and logged in real time. The configuration parameters can include for instance bits per symbol, accumulated dispersion, whereas quality metrics which may be determined at the receiver node can include a bit error rate BER or optical signal-to-noise ratios SNR.

In a possible embodiment, the learning engine 2 can be pre-trained based on the configuration and quality metrics. The training phase can comprise a simulation of lab-based measurements and corresponding ranks provided to the neural network forming the learning model of the learning engine 2. The artificial neural network ANN can intrinsically model relationships between various features.

Figure 14:
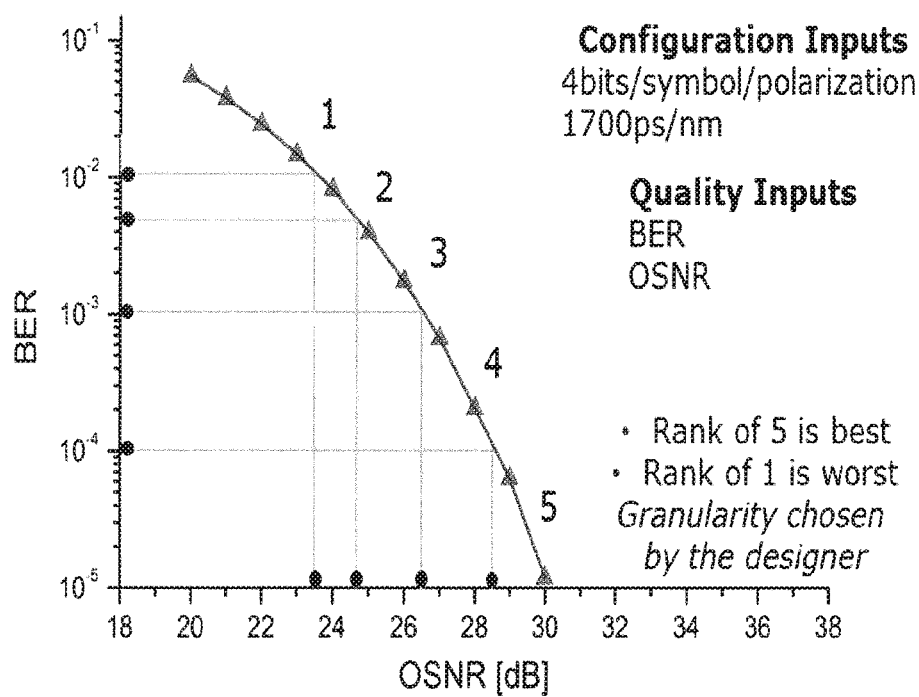
FIG. 14 shows a diagram for illustrating a training of a learning engine forming part of an apparatus according to the present invention.

An exemplary rank determination is illustrated in FIG. 14. For a given configuration, different ranks can be identified and used for neural network model learning. Several of such training configurations can be employed for an initial model construction. The training data can be expected to be coarse and the learning engine 2 is adapted to predict unseen configurations. The learning engine 2 comprising for instance an artificial neural network ANN as a learning model can be deployed in a live optical network where ranks for unseen configuration and quality features can be predicted in the learning framework based on the trained learning model for a channel under test and also for real-time neighboring network channels on the same signal path. The first determined rank in the example illustrated in FIG. 14 can be for instance 5/5, as typical optical systems are designed with conservative system margins.

Figure 15:
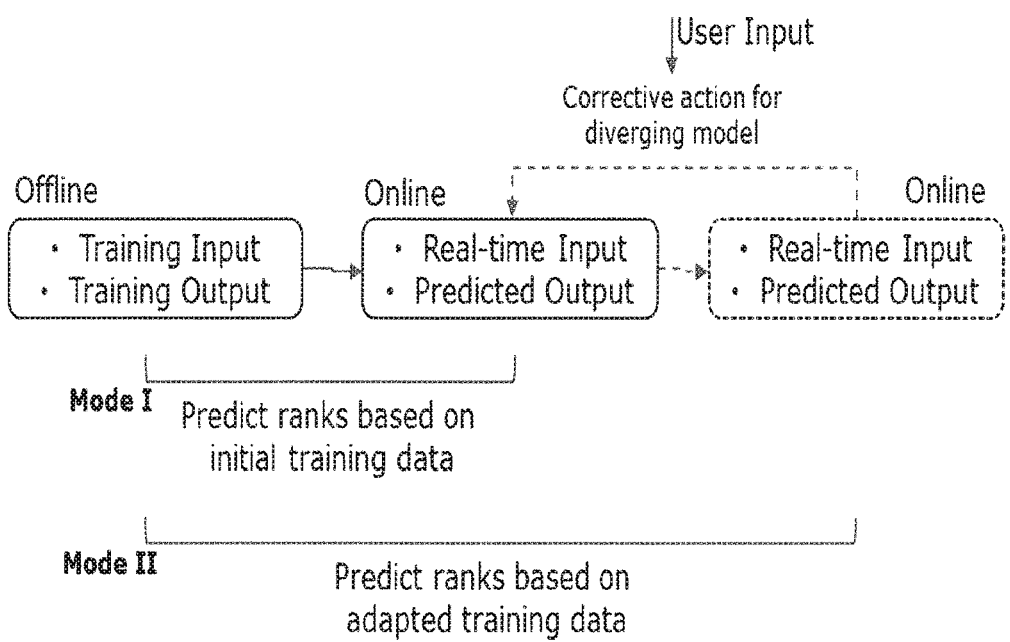
FIG. 15 illustrates the operation of a learning engine forming part of an apparatus according to the first aspect of the present invention.

As depicted in FIG. 15, the learning framework may work in two different modes. In a first mode, the learning framework is adapted to predict ranks based on the original training data, whereas the learning framework is adapted in a second mode to be adjusted to the real-time network by continuously updating its learning model based on mapping of input features to trained ranks. Since this may lead to model divergence, in a possible embodiment the data model is sporadically retuned based on real measurement data and corresponding ranks.

FIG. 16 illustrates a list of several possible learning engine input parameters.

The determined ranks can be centrally shared to the recommendation engine 3. The recommendation engine 3 can be adapted to provide or calculate a recommendation to adjust a signal throughput based on a per channel rank information and overall system policy. It may for instance restrict a data rate change if a neighboring network channel has a rank below r. The throughput increment or decrement granularity can be either predefined or input during runtime of the optical network 4 or may be based on real-time data-driven analysis. For example, the signal data rate may be increased to 150 Gb/s according to the recommendation provided by the recommendation engine 3 for optical span AB. The learning engine framework can be repeated until the optical signal is determined to be with a minimum possible rank. Furthermore, the recommendation engine 3 can also consolidate ranking information from different network channels and aggregate them (for instance, via averaging etc.) on path basis—together with a maximum available throughput per signal path—to determine best-working signal paths and corresponding optimum spectral windows. For instance, if AB and BC have respective data rates (ranks) of 200 Gb and 100 G, then AB is considered as the best-working signal path.

Throughput optimization may be carried out for deployed optical signals and in addition, an optimum signal path and an optimum spectral location of the network channel can be recommended by the recommendation engine 3. The use of a ranking system has several benefits. The channel ranking information serves as a unified metric for overall network optimization based on physical design metrics. Further, the ranking system allows for gradual throughput changes permitting for a safety mechanism in response to flash events in the optical network 4. The signal rank information can further be utilized to identify path quality. Path quality parameters (e.g. losses, etc.) may also be directly monitored and evaluated using the framework according to the present invention resulting in directly measured path ranks. The underlying signal paths may witness real-time degradations owing to a worsening load or physical degradations, in particular attenuation, polarization effects, optical fiber bends or misalignments. The method and apparatus according to the present invention can use multi-dimensional learning input parameters to determine signal quality. A central database can be used across various networks or network segments for training a learning model of a learning engine 2 and to provide optimization of a network performance. In a possible embodiment, a real-time sharing of information with other network resources can be provided. The method and apparatus 1 according to the present invention provide a mechanism to tolerate abrupt performance changes. The method and apparatus 1 use multi-layered ranking based optimization considering different network parameters and distinct channel quality information data. The channel rank information provided by the apparatus 1 according to the present invention can be used for derivation of optimum signal paths and optimum spectral locations for different network channels. In a possible embodiment, the method and apparatus 1 can comprise more than one learning engine 2 at a node level, network segment level or at a central level of the hierarchical network 4. The different learning engines 2 may operate in parallel to each other. The recommendation engine 3 of the apparatus 1 can both receive and transmit channel rank information at various network entities of the optical network 4. The channel rank information can be determined based on regular time intervals or event-driven in irregular time intervals. The ranking granularity and minimum/maximum levels can be arbitrarily decided according to the use case. The device learning information can be periodically backed up and can be recovered in case of a failure. The learning engine 2 can operate on one or more physical layers. Traffic ranks can be learned using linear or non-linear metric transformations. The payload throughput of a network channel can be increased or decreased based on a change of its network channel rank at any granularity. The time intervals for information sharing can be determined in a possible embodiment by a central controller 6 of the optical network 4. Further, the throughput of a network channel can be adapted by changing a modulation size, a symbol rate and/or by time, frequency or space multiplexing. In a possible embodiment, a link quality of an optical link can be determined based on individual and/or aggregated ranks of its constituent payload rates. Further, payload ranks, individual or aggregated, may be used to find best-performing spectral regions for a given signal path. Payload ranks may also be used to find a best-performing light path on a given optical network. A channel may comprise one or more ranks in case of an optical channel having several carriers. The multi-layer ranking information can be generated by the recommendation engine 3 on data received across different network layers of the hierarchical network 4. Multi-layer metrics can be used to determine rank information for a given network layer or for several network layers of the optical network 4. The learning engine 2 of the apparatus 1 can be trained using training data from multiple networks and/or network segments consolidated in a centralized database of the system. The proposed framework can also be used for hybrid modulation scenarios where a number of modulation and/or rate configurations can be predicted by the learning engine 2 of the apparatus 1.

The invention claimed is:

1. An apparatus for optimizing dynamically the performance of an optical network, said apparatus comprising:
at least one learning engine adapted to update a learning model in response to network metrics of said optical network collected during operation of said optical network,
wherein the updated learning model is used to generate channel rank information for network channels; and
a recommendation engine adapted to change a network channel throughput, a signal path and/or a spectral location of at least one network channel based on the channel rank information generated by the learning model of said learning engine,
wherein said recommendation engine is adapted to determine for each network channel a number of channels copropagating on the same optical span along a signal path within said optical network and to calculate a channel density of network channels per optical span of the signal path, and
wherein said recommendation engine is adapted to optimize a network channel throughput of at least one network channel whose channel rank information indicates a highest channel rank and/or having the lowest determined number of copropagating network channels and/or whose signal path comprises the lowest calculated channel density.

2. The apparatus according to claim 1 wherein the recommendation engine of said apparatus is adapted to calculate suitable signal paths for network channels and/or suitable spectral locations for network channels based on aggregated or combined channel rank information generated by the updated learning model of said at least one learning engine for the respective network channels.

3. The apparatus according to claim 1 wherein the learning model of said at least one learning engine comprises an artificial neural network, ANN, trained in a training phase with training data.

4. The apparatus according to claim 1 wherein the network channel throughput of at least one network channel is adjusted according to recommendations of the recommendation engine by altering channel characteristics of the respective network channel including transmission rate characteristics, wherein the transmission rate characteristics comprise symbol rates and/or payload rates, modulation format characteristics, signal constellation characteristics and/or error correction characteristics.

5. The apparatus according to claim 1 wherein the network metrics are monitored, collected and logged in real time during operation of said optical network and comprise single or multi-layer metrics including
configuration metrics, in particular spectral efficiency, amplifier types, fiber types, accumulated dispersion information and/or grid information,
operational metrics, in particular power supply levels, shelf temperature, laser temperature, humidity,
device metrics of network devices, in particular laser wavelength, amplifier noise, fiber loss, ROADM drift, and
system metrics comprising a bit error rate, optical signal-to-noise ratios, a Q-factor, non-linear noise and/or transceiver power.

6. The apparatus according to claim 1 wherein training data used for training the learning model of said learning engine comprises training data derived initially from span data of optical spans stored in span tables and/or from network planning data augmented during operation of said optical network by training data monitored, collected and logged from deployed network segments of said optical network.

7. The apparatus according to claim 1 wherein the network channel throughput, signal path and/or spectral location of a network channel is changed according to recommendations provided by the recommendation engine depending on the channel rank information of the respective network channel itself and/or depending on the channel rank information of other copropagating neighboring network channels located in the signal spectrum close to the respective network channel according to a predefined policy.

8. The apparatus according to claim 1 wherein the learning model is updated continuously by the at least one learning engine and exchanged and/or shared amongst different network segments of said optical network for initiating optimizations and/or in-operation training,
wherein network metrics of one or more network segments of said optical network are monitored, collected and logged in a common network metric database of said optical network and used to update continuously the learning model of the at least one learning engine.

9. The apparatus according to claim 1 wherein the recommendation engine of said apparatus is integrated in a central controller of said optical network and is triggered to control an adjustment of the network channel throughput, the signal path and/or the spectral location of the at least one network channel every time the learning model is updated by the learning engine in response to logged network metrics of said optical network.

10. The apparatus according to claim 1 wherein the at least one learning engine of said apparatus is integrated in a central controller and/or in a network management system of a network segment of said optical network and/or in a network control unit and/or in a shelf control unit located at a node site of a network node,
wherein the network metrics of said optical network are continuously monitored, collected and logged in real time to provide a quality metric vector applied to the learning model of the at least one learning engine.

11. The apparatus according to claim 1 wherein the optical network comprises several hierarchical network layers comprising:
a control layer including a central network controller of said optical network,
a network segment layer including several connected network segments of the optical network each having a network management system, NMS, entity and
a network node layer including network nodes each comprising a node control unit and/or a shelf control unit.

12. The apparatus according to claim 1 wherein channel rank information generated by a learning model of a learning engine implemented in a lower network layer is pushed during operation of the optical network in regular time intervals or event-driven via an exchange interface up to a learning engine implemented in an upper network layer of said optical network to provide a backup of the channel ranking information of the lower network layer.

13. The apparatus according to claim 1 wherein each network channel of the optical network comprises one or several carriers.

14. The apparatus according to claim 1 wherein the channel rank information of a network channel indicates a performance margin of the respective network channel and forms a unified metric for network optimization.

15. The apparatus according to claim 1 wherein the execution engine of said apparatus is adapted to change a network channel throughput, a signal path and/or a spectral location of at least one network channel based on individual and/or aggregated channel rank information to provide a local and/or a global optimization of the performance of said optical network.

16. An apparatus for optimizing dynamically the performance of an optical network, said apparatus comprising:
at least one learning engine adapted to update a learning model in response to network metrics of said optical network collected during operation of said optical network,
wherein the updated learning model is used to generate channel rank information for network channels; and
a recommendation engine adapted to change a network channel throughput, a signal path and/or a spectral location of at least one network channel based on the channel rank information generated by the learning model of said learning engine,
wherein the recommendation engine of said apparatus is adapted to calculate a recommendation for a best signal path and/or best spectral location of at least one network channel based on aggregated channel rank information, and
wherein the calculated recommendation for a best signal path and/or a best spectral location of at least one network channel is applied to an RWA unit or another execution engine adapted to execute the recommendation and to route an additional network channel and/or to reroute an existing network channel along the suitable best signal path through said optical network in response to the received recommendation which is based on aggregated and/or combined channel rank information generated by the learning model of the at least one learning engine and based on topology information of the network topology of said optical network stored in a topology database.

17. The apparatus according to claim 16 wherein the RWA unit and the other execution engine is adapted to allocate an additional network channel and/or to reallocate an existing network channel to the recommended suitable spectral location according to a received recommendation generated by said recommendation engine which is based on aggregated and/or combined channel rank information generated by the learning model of the at least one learning engine.

18. The apparatus according to claim 16 wherein the execution engine of said apparatus is adapted to adjust a network channel throughput, a signal path and/or a spectral location of at least one network channel continuously and gradually to absorb abrupt changes of monitored metrics of said optical network collected in real time during operation of said optical network.

19. An apparatus for optimizing dynamically the performance of an optical network,
said apparatus comprising:
at least one learning engine adapted to update a learning model in response to network metrics of said optical network collected during operation of said optical network,
wherein the updated learning model is used to generate channel rank information for network channels; and
a recommendation engine adapted to change a network channel throughput, a signal path and/or a spectral location of at least one network channel based on the channel rank information generated by the learning model of said learning engine,
wherein if a failure of an entity occurs in a lower network layer of said optical network, the learned model is recovered for said lower network layer by pushing in a recovery mode the backup channel ranking information of the lower network layer from a learning engine of an upper network layer via an exchange interface down to a learning engine of the lower network layer.

20. A method for optimizing dynamically the performance of an optical network comprising the steps of:
updating a learning model in response to network metrics of said optical network collected during operation of said optical network;
generating channel rank information for network channels by the updated learning model; and
changing a channel throughput, a signal path and/or a spectral location of at least one network channel based on the generated channel rank information;
determining for each network channel a number of channels copropagating on the same optical span along a signal path within said optical network to calculate a channel density of network channels per optical span of the signal path, and
optimizing a network channel throughput of at least one network channel whose rank information indicates a highest channel rank and/or having the worst determined number of copropagating network channels and/or whose signal path comprises the worst calculated channel density.

* * * * *